United States Patent [19]
Oswalt, Jr.

[11] 3,866,522
[45] Feb. 18, 1975

[54] METAL WORKING MACHINE

[76] Inventor: Harry L. Oswalt, Jr., 615 Briar Hill, Garden City, Kans. 67847

[22] Filed: July 27, 1973

[21] Appl. No.: 383,092

[52] U.S. Cl..................... 72/324, 72/332, 83/599, 83/605, 83/606, 83/608, 83/644
[51] Int. Cl............................................. B21d 43/28
[58] Field of Search........ 72/324, 332; 83/599, 605, 83/606, 608, 644, 699; 30/229

[56] References Cited
UNITED STATES PATENTS

| | | | |
|---|---|---|---|
| 2,552,958 | 5/1951 | Graham et al. | 83/542 |
| 3,140,634 | 7/1964 | McDaniel | 83/599 |
| 3,150,551 | 9/1964 | Spengler et al. | 83/699 |
| 3,170,357 | 2/1965 | Ridgway | 83/608 |
| 3,263,541 | 8/1966 | Stockard | 83/599 |
| 3,468,206 | 9/1969 | Bakula | 83/599 |
| 3,701,276 | 10/1972 | Malmgren | 83/599 |

*Primary Examiner*—C. W. Lanham
*Assistant Examiner*—James R. Duzan

[57] ABSTRACT

A machine for fabricating workpieces, provided with shears, punches, press brakes, a notcher or coper, and other accessories, such as forming, shaping, bending and cut-off tooling, has a power beam swingable vertically on a horizontal bed that is interposed between the beam and a hydraulic ram, as well as other associated parts under the bed, which operably connect the ram with the beam. The connecting parts include a linkage and a bell crank so arranged as to apply pressure that is fully adequate to carry out a multiplicity of operations along the entire beam of relatively heavy, thick metal stock of any length and of numerous shapes. One of the shear knives is floatingly mounted on the beam in a novel manner to properly handle L-shaped or other angle members.

8 Claims, 8 Drawing Figures

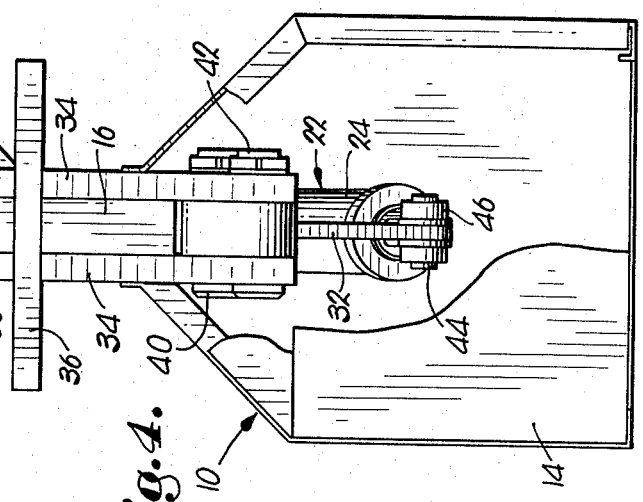
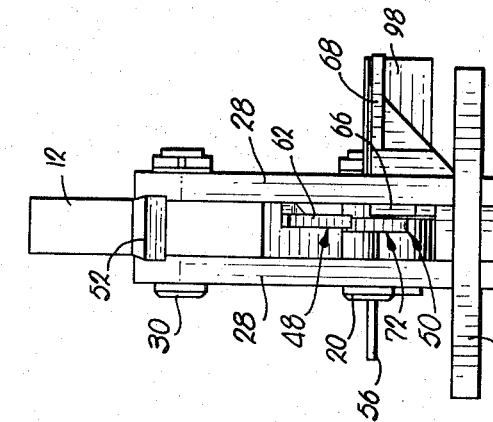
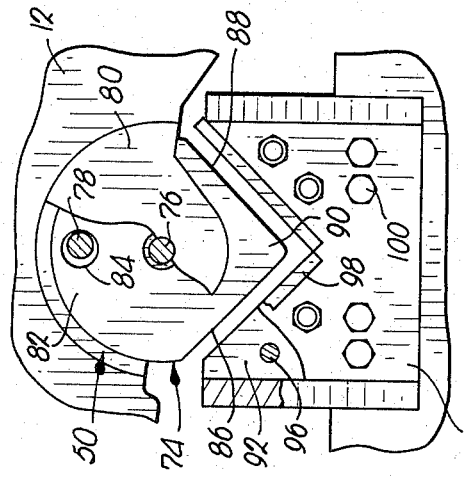
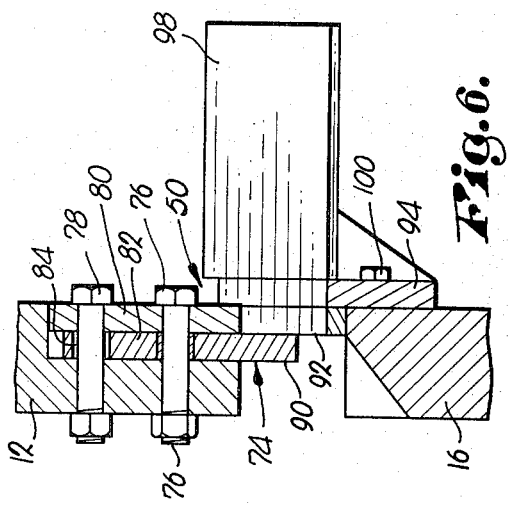
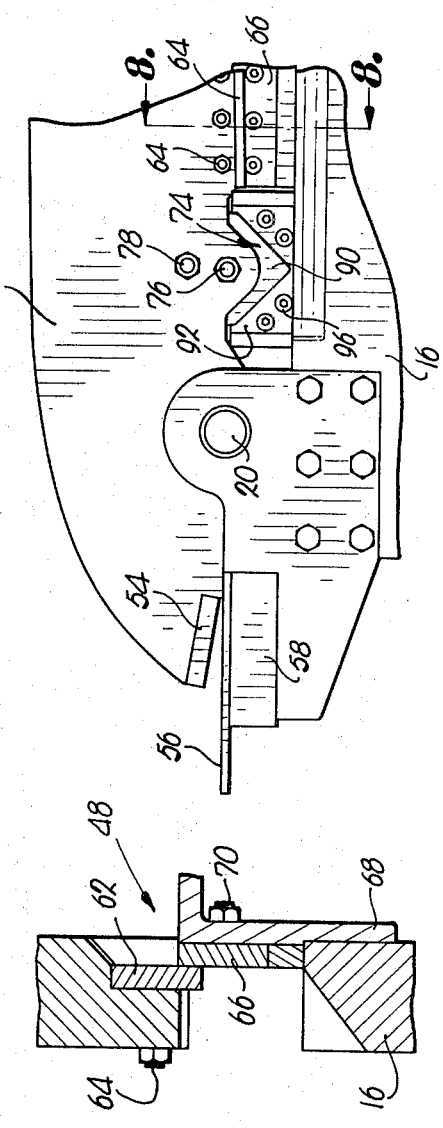

METAL WORKING MACHINE

Machine and maintenance shops, structural steel plants, production, manufacturing and research departments, factories, mills and the like require metal working equipment capable of performing a wide variety of operations. Use of a single machine for carrying out each of such separate steps results in high capital expenditures and maintenance costs, inconvenience and increased space requirements. In the metal working field there is, therefore, a need for a single piece of machinery capable of carrying out a multiplicity of such fabrications steps with ease and convenience, yet not be limited to light gauge materials having minimum power requirements.

Such need is met by my present invention in the provision of a relatively, small yet unusually powerful and highly versatile machine, so designed as to easily accommodate relatively thick, heavy stock of various shapes and sizes, and capable of performing a multiplicity of metal working operations which usually require many separate pieces of equipment.

IN THE DRAWINGS:

FIG. 4 is a front elevational view, parts being broken away for clearness;

FIG. 5 is a fragmentary view showing that side of the machine opposite to FIG. 1, but with the beam in its lowered position;

FIG. 6 is a fragmentary detailed cross-sectional view taken on line 6—6 of FIG. 1;

FIG. 7 is an enlarged fragmentary elevational view similar to FIG. 1 illustrating one of the shears; and FIG. 8 is a fragmentary detailed cross-sectional view on line 8—8 of FIG. 5.

Figure 3:
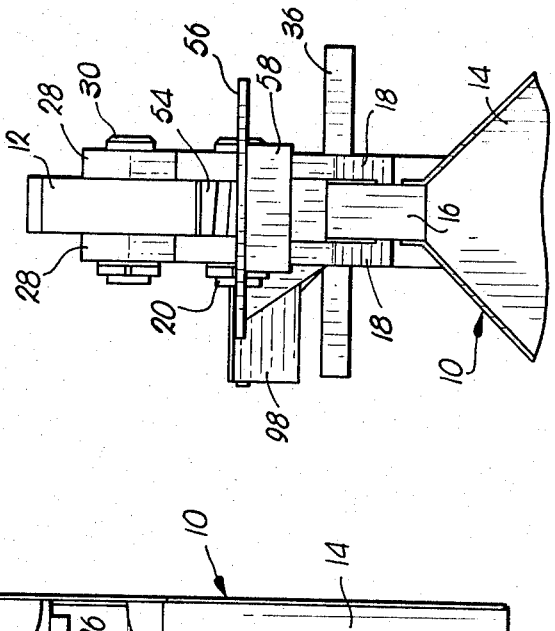
FIG. 3 is a fragmentary detailed cross-sectional view taken on line 3—3 of FIG. 1.
Figure 2:
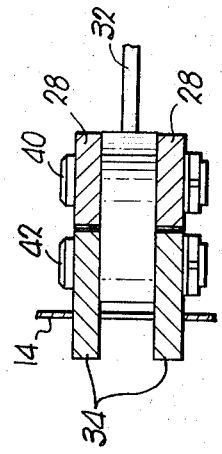
FIG. 2 is a fragmentary, rear elevational view.

A support 10 for an enlongated, vertically swingable beam 12 includes a hollow base 14 which carries an elongated, horizontal bed 16 underlying the beam 12. A pair of side plates 18 secured to the bed 16 at one end thereof supports the beam 12 adjacent the proximal end of the latter by a pivot pin 20 which traverses the beam 12.

The base 14 houses an inclined, diagonally disposed, fluid pressure, piston and cylinder assembly 22, such as a double acting hydraulic ram, which includes a cylinder 24 underlying the bed 16 and connected thereto at one end of the cylinder 24 by a pintle 26 that is in near vertical alignment with the pivot pin 20.

The beam 12 and the bed 16 are embraced by a pair of elongated, vertically swingable links 28 which are attached to the beam 12 adjacent its forward end by a transverse hinge pin 30 and which depend from the beam 12 into the base 14. A bell crank 32 within the base 14 between the links 28 is also interposed between a pair of braces 34 secured to an overlying platform 36 and to the bed 16 by bolts 38 which extend between the braces 34. Horizontal pivot pins 40, 42 and 44, joining the crank 32 to the links 28, the braces 34 and the piston stem 46 of the assembly 22 respectively, are in parallelism with the pins 20 and 26. The base 14 also houses the hydraulics (not shown) for the assembly 22, including a compressor and its motor, a hydraulic fluid reservoir, valves, conduits and other components conventionally needed and employed in hydraulic systems of this nature.

The entire lengths of the beam 12 and the bed 16 are placed in use for accommodating various metal working tools, including a pair of shears 48 and 50 between the plates 18, 18 and the links 28, 28. Moreover, in cooperation with the platform 36 the front end of the beam 12 outboard of the links 28 has a tool mounting plate 52. One primary use of the plate 52 is to support various types of mounts for punches or the like (not shown) operating against workpieces held in place on the platform 36 by suitable fixtures. Other forming and shaping tools may be used on the plate 52, and the platform 36 may be provided with proper mounts, jigs, dies and fixtures as is well known and understood by machinists generally. Still further, the rear end of the beam 12 outboard of the pin 20 has a notcher or coper 54 cooperable with a work supporting anvil 56 that is mounted on a block 58 supported by the bed 16 and the plates 18.

The shear 48 includes a movable blade 62, inset within and attached to the beam 12 by bolts 64, and a stationary blade 66 beneath the beam 12 and attached to a holder 68 by bolts 70, the holder 68 being secured to one side of the bed 16 by bolts 72. The shear 50, on the other hand, includes a movable blade 74 inset within the beam 12 and attached thereto by a pivot bolt 76 as well as by a stop bolt 78. The bolts 76 and 78 pass through a cover 80 and through a substantially semicircular portion 82 of the blade 74. A hole 84 in the portion 82 is somewhat larger than the stop bolt 78 which it receives. Bolts 76 and 78 traverse the beam 12 in parallelism with the pin 20.

Cutting edges 86 and 88 of a triangular portion 90 of the blade 74 cooperate with the V-shaped stationary blade 92 beneath the beam 12 and mounted on a similarly shaped holder 94 by bolts 96. The holder 94 also supports a work-supporting trough 98 and is secured to one side of the bed 16 by bolts 100.

In operation, workpieces are placed on the platform 36, in the trough 98, on the holder 68 and/or on the anvil 56 in proper position before actuation of the assembly 22. The shears 48 and 50, as well as the tooling used in connection with the platform 36, operate on the downstroke of the beam 12, whereas the notcher or coper 54 performs its work on the upstroke of the beam 12.

Figure 1:
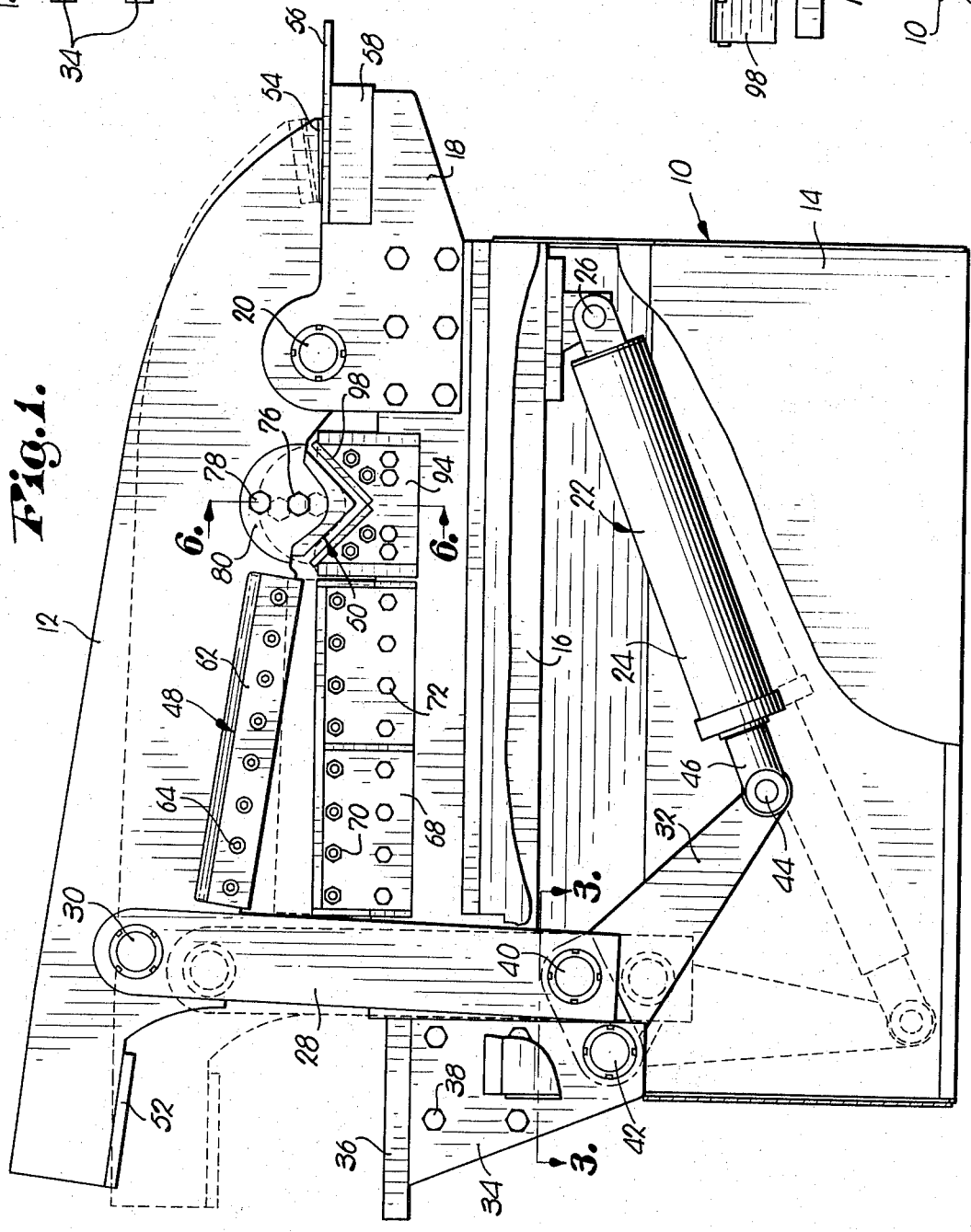
FIG. 1 is side elevational view of a metal working machine made according to my present invention.

When hydraulic fluid under pressure is directed to the cylinder 24 at its upper end, piston stem 46 is extended to rotate the crank 32 clockwise, viewing FIG. 1, thereby pulling the links 28, 28 downwardly and swinging the beam 12 toward the bed 16 about the pivot pin 20, all as shown by dotted lines in FIG. 1. During such stroke of the assembly 22, metal workpieces may be punched or otherwise fabricated between the plate 52 and the platform 36, or may be severed either between the blades 62 and 66 or between the blades 74 and 92.

On both power strokes of the assembly 22 the available forces therefrom are substantially multiplied by the connections between the beam 12 and the stem 46 which include the links 28, 28 and the crank 32 such that exceedingly high pressures are applied to the workpieces at each of the four work areas 36, 48, 50 and 56, making it possible to handle heavy gauge metals of various shapes and degrees of hardness.

Moreover, all of the operating components for actuating the beam 12 are housed within the base 14 out of the way and in a location where they are not subject to damage. Also, leaking hydraulic fluid cannot interfere with the operators, the workpieces or the components of the machine above the base 14.

The type of shear 50 above described is especially advantageous because it accommodates for the fact that the beam 12 moves the blade 74 through an arcuate rather than a rectilinear path of travel, and because of the fact that the angles of the L-shaped workpieces placed between the blades 74 and 92 may not always be fully complemental to the angle between the cutting edges 86 and 88.

As such edges move into engagement with the flanges of the angle iron or the like, the blade 74 is free to move about the bolt 76, limited only by the bolt 78. Thus, the self-aligning triangular portion 90 of the blade 74 seats properly in the workpiece and effects a proper cut more easily and quickly than if the oscillating feature of the blade 74 were not provided. As a matter of fact, the portion 90 of the blade 74 oftentimes bends the workpiece into conformity with the angularity of the edges 86 and 88.

Having thus described the invention, what is claimed as new and desired to be secured by Letters Patent is:

1. In a machine for fabricating workpieces:
   a horizontally extending bed;
   an elongated, generally horizontally extending beam disposed above said bed;
   pivot means supporting the beam for swinging movement toward and away from the bed about an axis disposed transversely of the beam,
   said beam and said bed having opposed sets of mutually cooperable tool means spaced therealong with certain sets disposed further from said axis than others;
   power means disposed below said bed and including a reciprocable member having a stroke of predetermined length;
   upright linkage depending from said beam to a position below said bed and spaced laterally from said pivot means; and
   a swingable crank intercoupling said member and the lower end of the linkage for swinging the beam about said axis during actuation of said power means,
   said crank disposing said linkage for movement of the linkage through a displacement substantially less than said stroke of the member whereby to multiply the force applied by said power means to the beam during actuation of the power means.

2. In a machine as claimed in claim 1, said crank being swingable on said bed about an axis parallel with said axis of the beam.

3. In a machine as claimed in claim 2, said linkage pivotally interconnecting the beam and the crank.

4. In a machine as claimed in claim 3, said member being fluid pressure actuated.

5. In a machine as claimed in claim 1; and an angle shear intermediate the ends of said bed and beam including a floating cutter blade mounted for self alignment with the work piece being severed.

6. In a machine as claimed in claim 1, said blade being secured to the beam for swinging movement about an axis parallel with said axis of the beam.

7. In a machine for fabricating workpieces:
   a bed;
   an elongated beam pivotally supported for swinging movement in an arcuate path of travel toward and away from said bed;
   a stationary, generally V-shaped shear blade mounted on said bed adjacent the axis of swinging movement of said beam for complementally receiving an article to be severed having a similar cross sectional configuration; and
   a floating cutter blade mounted on said beam adjacent said axis in position to cooperate with said shear blade in severing the article when the beam is swung toward said bed,
   said cutter blade being generally complemental to said shear blade and being mounted for pivoting movement about an axis transverse to the arcuate path of travel of said beam whereby the cutter blade can remain complementally aligned with the shear blade and article during severance of the latter notwithstanding arcuate movement of the beam.

8. In a machine as claimed in claim 7; and means limiting the extent of pivoting movement of said blade.

* * * * *